United States Patent [19]

Kasai

[11] Patent Number: 4,692,038

[45] Date of Patent: Sep. 8, 1987

[54] LINEAR MOTION ROLLING CONTACT BEARING ASSEMBLY HAVING A LOAD DEPENDENT VARIABLE RESISTANCE

[75] Inventor: Naomi Kasai, Tokyo, Japan

[73] Assignee: Nippon Thompson Co., Ltd., Tokyo, Japan

[21] Appl. No.: 863,636

[22] Filed: May 15, 1986

[30] Foreign Application Priority Data

May 20, 1985 [JP] Japan ............... 60-73562[U]

[51] Int. Cl.$^4$ ........................ F16C 31/06
[52] U.S. Cl. ........................ 384/45; 384/43
[58] Field of Search ............... 384/43–45, 384/49, 55

[56] References Cited

U.S. PATENT DOCUMENTS

| 42,066 | 3/1864 | Bishop | 384/45 |
|---|---|---|---|
| 2,047,868 | 7/1936 | Harley | 384/49 |
| 2,400,374 | 5/1946 | Selnes | 384/49 |
| 3,311,426 | 3/1967 | Binns | 384/45 |
| 3,721,478 | 3/1973 | Anderson et al. | 384/45 |
| 3,934,946 | 1/1976 | Burr et al. | 384/45 |
| 4,441,765 | 4/1984 | Kasai et al. | 384/45 |
| 4,502,737 | 3/1985 | Osawa | 384/45 |

Primary Examiner—Stuart S. Levy
Assistant Examiner—Thomas R. Hannon
Attorney, Agent, or Firm—Thomas S. MacDonald; Alan H. MacPherson; Paul J. Winters

[57] ABSTRACT

A linear motion rolling contact bearing assembly includes a rail, a slider movable along the rail, and a plurality of balls partly interposed between the slider and the rail to provide a rolling contact relation between the slider and the rail. The rail is provided with at least one inner guide groove and the slider is provided with at least one outer guide groove which is located in an oppositely disposed relation to the inner guide groove, thereby defining a load section. The slider is also provided with an endless path which includes the load section as a part thereof, and a plurality of balls are received in the endless path. The inner and outer guide grooves are structured such that each of the balls in the load section contacts at one point with each of the inner and outer guide grooves under light load conditions. Under heavy load conditions, all of the balls in the load section contact at two points with each of the inner and outer guide grooves to provide an increased load bearing ability.

7 Claims, 6 Drawing Figures

Fig. 3
Fig. 4
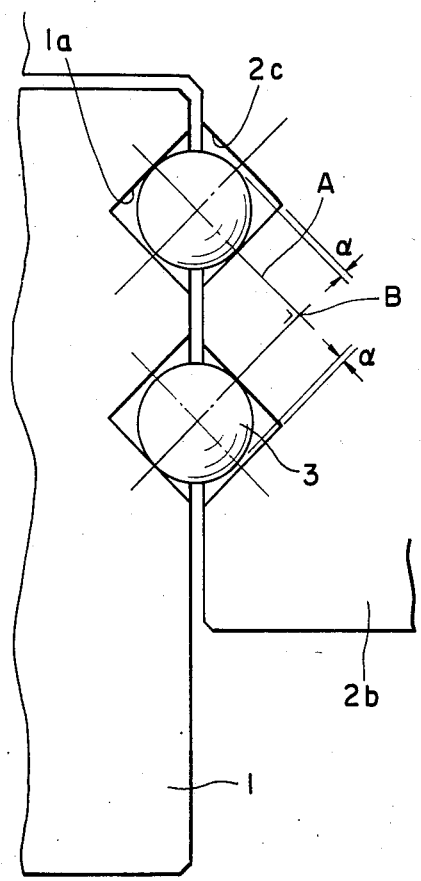
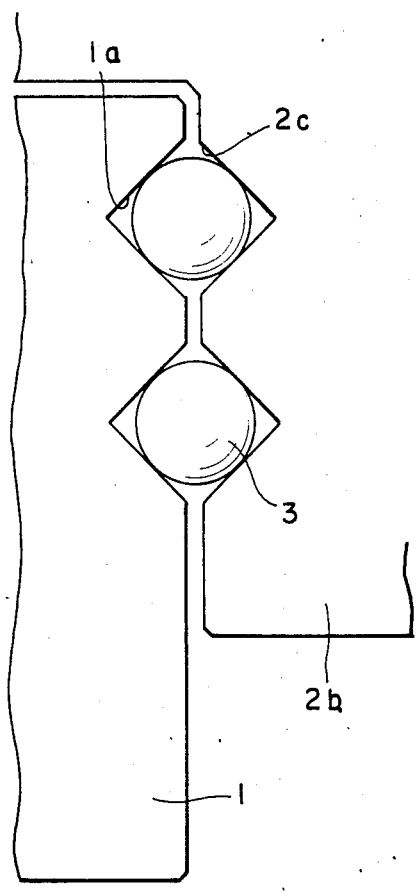

LINEAR MOTION ROLLING CONTACT BEARING ASSEMBLY HAVING A LOAD DEPENDENT VARIABLE RESISTANCE

BACKGROUND OF THE INVENTION

1. Field of the Invention

This invention generally relates to a linear motion rolling contact bearing assembly for providing a theoretically unlimited linear relative motion between a slider and a rail, and, in particular, to a linear motion rolling contact bearing assembly whose rolling contact resistance varies automatically depending on the magnitude of a load applied.

2. Description of the Prior Art

A linear motion rolling contact bearing assembly is well known in the art, and it generally includes a rail extending straight over a desired length, a slider which moves along the rail, and a plurality of balls interposed between the rail and the slider thereby providing a rolling contact between the slider and the rail. The slider is provided with at least one endless path, a part of which is defined as a load path section between the slider and the rail so that the balls located in this load section provide a rolling contact relation between the slider and the rail. Since the balls may circulate indefinitely along the endless path, theoretically, there may be provided an unlimited linear motion for the slider; however, in actuality, the linear motion of the slider is limited by the length of the rail provided.

Typically, the rail has a pair of side surfaces each of which is provided with a guide groove and the slider is provided with a pair of endless paths each of which defines a load section together with the corresponding one of the pair of guide grooves formed in the rail. That portion of the endless path which defines the load section is also in the shape of a groove which faces the corresponding groove of the rail to define a passage therebetween. Each of these grooves is normally so designed that each of the balls when located in the load section comes into contact at two points. Thus, each of the balls located at the load section normally has four contact points, i.e., two contact points with the groove of the rail and two contact points with the groove of the slider.

It is true that, if each of the balls has four contact points at the load section, it can withstand higher loads with less distortion. However, the larger the number of contact points, the higher the level of rolling contact resistance. This effect is multiplied if the number of the balls located in the load section increases. Thus, this may limit the application of linear motion rolling contact bearing assemblies to high speed applications and/or light load applications.

SUMMARY OF THE INVENTION

In accordance with the present invention, there is provided a linear motion rolling contact bearing assembly having a self-adjustable load bearing function. The linear motion rolling contact bearing assembly of the present invention includes a rail extending straight over a given length, a slider movable along the rail, and a plurality of balls partly interposed between the slider and the rail to provide a rolling contact relation. The slider is provided with at least one endless path for allowing the balls to circulate therealong. The rail is provided with at least one inner guide groove and the slider is provided with at least one outer guide groove as a part of the endless path, which faces the inner guide groove to define a load section where the balls are placed in rolling contact with the inner and outer guide grooves. The inner and outer guide grooves are so defined that each of the balls in the load section makes one contact with each of the inner and outer guide grooves unless a load does not exceed a predetermined level.

With the structure of the present invention, the balls make a minimum number of rolling contacts with the guide grooves under light load condition, so that the rolling contact resistance between the slider and the rail is minimized. And, as the level of load increases, an increasing number of balls come to make four contacts with the inner and outer guide grooves so as to provide an increased load bearing function.

It is therefore a primary object of the present invention to obviate the disadvantages of the prior art as described above and to provide an improved linear motion rolling contact bearing assembly.

It is another object of the present invention to provide a novel linear motion rolling contact bearing assembly having a self-adjusting load bearing function.

It is a further object of the present invention to provide a novel linear motion rolling contact bearing assembly having a reduced rolling contact resistance under light load conditions and an increased rolling contact resistance under heavy load conditions.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic illustration showing a part of the bearing assembly shown in FIGS. 1 and 2 under light load conditions;

FIG. 4 is a schematic illustration showing a the same part of the bearing assembly shown in FIGS. 1 and 2 as in FIG. 3 under heavy load conditions;

DESCRIPTION OF THE PREFERRED EMBODIMENTS

Figure 1:
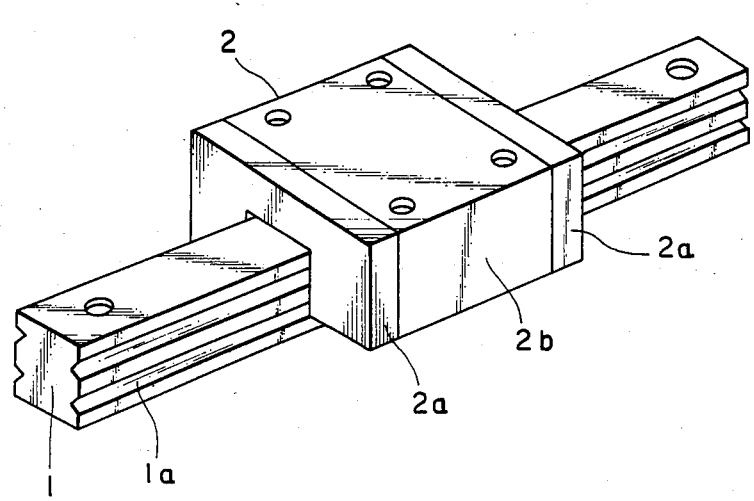
FIG. 1 is a schematic, perspective view showing a linear motion rolling contact bearing assembly constructed in accordance with one embodiment of the present invention.
Figure 2:
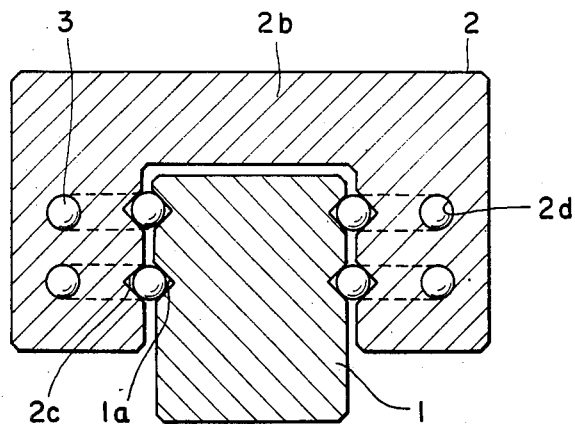
FIG. 2 is a transverse, cross sectional view of the bearing assembly shown in FIG. 1.

Referring to FIGS. 1 and 2, there is shown a linear motion rolling contact bearing assembly constructed in accordance with one embodiment of the present invention. As shown, the present bearing assembly includes a rail 1 which is generally square in cross section and extends straight over a desired length. The rail 1 may be as long as desired. The rail 1 has a pair of vertical side surfaces on both sides and each of the side surfaces is provided with a pair of upper and lower inner guide grooves 1a, 1a. These guide grooves 1a, 1a extend straight and, for example, may be V-shaped, U-shaped, or Gothic arch-shaped in cross section.

The bearing assembly also includes a slider 2 which is generally in the shape of inverted U in cross section, so that the slider 2 is slidably mounted on the rail 1 in a straddling manner. The slider 2 is comprised of a main body 2b and a pair of end plates 2a, 2a, each of which is fixedly attached to each end of the main body 2b. As shown in FIG. 2, the slider 2 is provided with four endless paths: two in one leg of the slider 2 and two in the other leg of the slider 2. The slider 2 is also provided with a pair of upper and lower outer guide grooves 2c in each of the legs, each of which extends straight in parallel with and oppositely disposed relation to the corresponding one of the pair of inner guide grooves 1a of the rail 1. The outer guide groove 2c defines a load section which is also a part of the endless path. The endless path is thus comprised of the load section and a return section 2d which is connected between both ends of the load section. A plurality of balls 3 are placed in the endless path, and those balls 3 located in the load section provide a rolling contact relation between the rail 1 and the slider 2. The upper and lower outer guide grooves 2c, 2c may be V-shaped, U-shaped, or Gothic arch-shaped in cross section, for example.

With this structure, since the balls 3 may circulate along the endless path and they provide a rolling contact relation between the rail 1 and the slider 2 when located at the load section, the slider 2 may move along the rail 1 as long as the rail 1 extends. As will be appreciated, at least one load section must be provided on either side of the rail 1. And, in the illustrated embodiment, since the two load sections are provided on either side of the rail 1, it has an increased load bearing ability. However, such an increase in the number of load sections also indicates an increase of rolling contact resistance. Thus, the illustrated bearing assembly would present an unnecessarily large rolling contact resistance under light load conditions. In other words, only the top two or bottom two load sections are necessary in the structure shown in FIGS. 1 and 2 for the bearing assembly to properly operate under light load conditions. It is only at such time when the load applied to the bearing assembly has exceeded a predetermined level that all of the four load sections are required to become effective so as to sustain a large load.

In order to attain such objects, in accordance with the present invention, the paired inner and outer guide grooves 1a and 2c are structured so that each of the balls 3 in the load section makes only one contact with each of the paired inner and outer guide grooves. This aspect will be described more in detail with reference to FIG. 3. As shown in FIG. 3, the paired inner and outer guide grooves 1a and 2c are both V-shaped in the illustrated example, and the paired V-shaped inner and outer guide grooves 1a and 2c are so structured that the distance between one face of the inner guide groove 1a and one face of the outer guide groove 2c is larger than the distance between the other face of the inner guide groove 1a and the other face of the outer guide groove 2c by a predetermined amount (alpha). Thus, when the balls 3 are located in the load section, each of the balls 3 only makes one contact with each of the paired inner and outer guide groove 1a and 2c. In FIG. 3, each of the balls 3 makes only one contact with each of the paired inner and outer guide grooves 1a and 2c in each of the upper and lower load sections. As a result, the total number of contact points made by the balls are decreased to half as compared with prior art structures. This also indicates a reduction of rolling contact resistance by half.

In the example shown in FIG. 3, a load bearing line A is defined by the balls 3 in the upper load section and another load bearing line B is defined by the balls 3 in the lower load section. In the illustrated example, these load bearing lines A and B are perpendicular to each other, though the present invention should not be limited only to such a specific structure.

Figure 5:
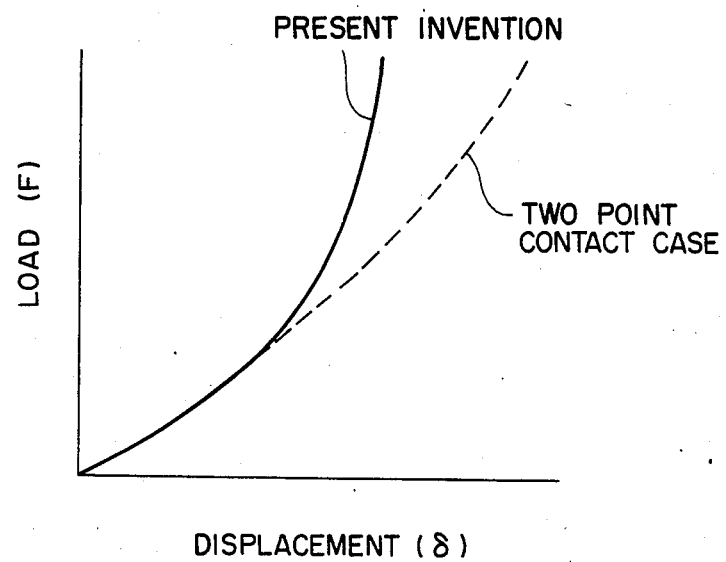
FIG. 5 is a graph useful for explaining the advantages of the present invention.

FIG. 4 shows the condition when a larger load is applied to the present bearing assembly. In this case, if the load applied has increased beyond a predetermined level, all of the balls 3 in the upper and lower load sections come into arrangement to make four contact points between the rail and slider. That is, each of the balls 3 in the upper and lower load sections contacts with each of the paired inner and outer guide grooves 1a and 2c at two points. When this condition has been established, even if the applied load further increases in magnitude, there will be created no further distortion, thereby indicating the capability to withstand an increased load. This feature of the present invention will be better understood when reference is made to FIG. 5. If the two-point contact condition remains longer, FIG. 5 shows that a larger distortion or displacement (delta) will be produced. However, in accordance with the present invention, two-point contact condition is converted into the four-point contact condition beyond a predetermined load level, and the amount of distortion or displacement becomes limited, even if the applied load further increases.

Figure 6:
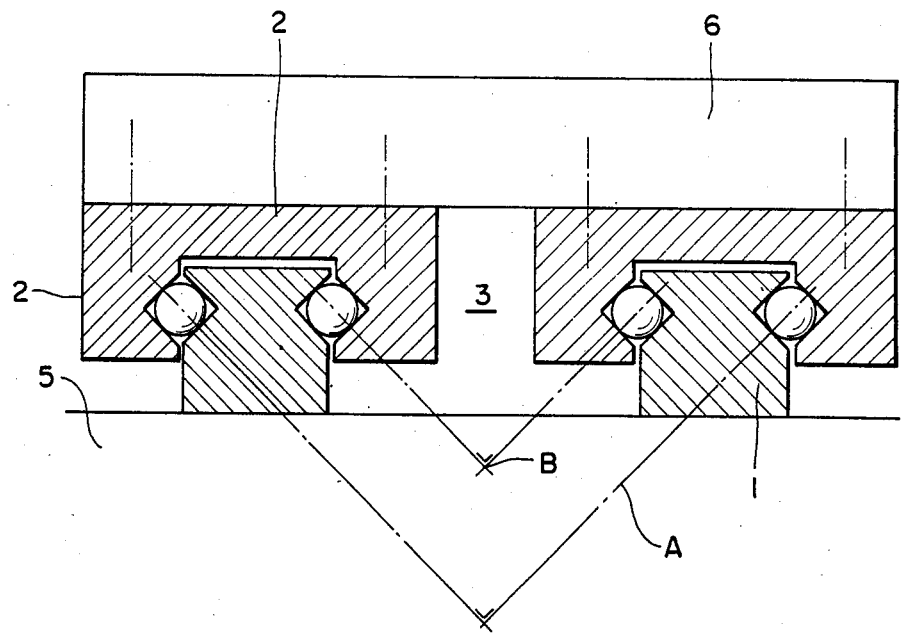
FIG. 6 is a schematic, cross sectional view showing a linear motion rolling contact bearing assembly constructed in accordance with another embodiment of the present invention.

FIG. 6 shows a liner motion rolling contact bearing assembly having a self-adjusting load bearing function constructed in accordance with another embodiment of the present invention. The present bearing assembly includes a bed 5 on which a pair of rails 1 are fixedly mounted and arranged in parallel and spaced apart from each other over a predetermined distance. Each of the rails 1, 1 has an identical structure and is provided with an inner guide groove on each side surface. Also provided is a table 6 to which a pair of sliders 2, 2 are fixedly attached, and each of the sliders 2 has an identical structure and is provided with a pair of outer guide grooves, each of which faces a corresponding one of the inner guide grooves of the rail 1 to define a load section therebetween. Although not shown, each of the sliders 2 is provided with a pair of endless paths, each of which includes one of the load sections as a part thereof. And, a plurality of balls 3 are provided in each of the endless paths, so that there are provided four load sections, where the balls 3 provide a rolling contact relation between the bed 5 and the table 6.

Thus, the present bearing assembly also provides an increased load bearing capability. In addition, as indicated by the load bearing lines A and B under light load conditions, each of the balls 3 in each of the four load sections arranged horizontally makes only one contact with each of the paired inner and outer guide grooves 1a and 2c under light load conditions. This indicates that the rolling contact resistance is minimized under the light load conditions so that the table 6 may move relative to the bed 1 with a minimum of resistance. On the other hand, when the load applied to the table 6 has increased beyond a predetermined level, all of the balls in the four load sections come to make four contacts, thereby providing an increased load bearing capability. Although the load bearing lines A and B are perpendicular to each other, respectively, they may intersect at other angles, such as 60°, than 90°.

In the embodiments described above, it has been described with respect to the case where each of the guide grooves has a V-shaped cross section. It is to be noted, however, that each of the guide grooves may have other cross sectional shapes, such as letter "U" or Gothic arch, which is defined by two arcs.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly, comprising:
a rail having at least one first guide groove;
a slider slideably mounted on said rail and having at least one second guide groove opposite to said first guide groove, thereby defining a load section therebetween, said slider including at least one endless path which includes said second guide groove as a part thereof;
a plurality of circular balls received in said endless path, said plurliaty of balls circulating along said endless path including along said load section as said slider moves along said rail; and
wherein said first and second guide grooves are each configured with a first surface tangently touching said balls in said load section such that each of said balls in said load section contacts at one point only with each of said first and second guide grooves at any one instant as long as an applied load by said slider remains smaller than a predetermined load operating level.

2. The assembly of claim 1 wherein each of said first and second guide grooves has a V-shaped cross section and wherein a surface of said V-groove provides the first surface tangent to the line of balls in said load section.

3. The assembly of claim 1 wherein each of said first and second guide grooves has a U-shaped cross section and wherein a surface of said U-shaped groove provides the first surface tangent to the line of balls in said load section.

4. The assembly of claim 1 wherein each of said first and second guide grooves has a Gothic arch-shaped cross section and wherein a surface of said Gothic-arch groove provides the first surface tangent to the line of balls in said load section.

5. The assembly of claim 1 wherein said rail is provided with said first guide groove one on each side surface thereof and said slider has a generally inverted-U-shaped cross section, thereby straddling said rail, and is provided with a pair of said second guide grooves each oppositely disposed to the corresponding one of said pair of first guide grooves.

6. The assembly of claim 1 wherein said first and second guide grooves are further configured with a second surface at an angle to said first surface and tangent to the line of said balls in said load section such that, upon imposition of an applied load by said slider greater than said predetermined load operating level, all of said balls in said load section contact at any one instant one point only on each of said first and second surfaces of each of said first and second guide grooves.

7. The assembly of claim 6 wherein said first and second guide grooves are V-grooves and wherein both V-surfaces of each of said first and second guide grooves make point contact with said balls in said load section upon imposition of said load greater than said predetermined load operating level.

* * * * *